(12) United States Patent
Singhal et al.

(10) Patent No.: US 11,144,233 B1
(45) Date of Patent: Oct. 12, 2021

(54) EFFICIENTLY MANAGING POINT-IN-TIME COPIES OF DATA WITHIN A PRIMARY STORAGE SYSTEM

(71) Applicant: EMC IP Holding Company LLC, Hopkinton, MA (US)

(72) Inventors: Upanshu Singhal, Bangalore (IN); Sanjeev Kumar Lohchab, Banglore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 29 days.

(21) Appl. No.: 16/822,397

(22) Filed: Mar. 18, 2020

(51) Int. Cl.
  *G06F 3/06* (2006.01)
(52) U.S. Cl.
  CPC .............. *G06F 3/065* (2013.01); *G06F 3/067* (2013.01); *G06F 3/0619* (2013.01)
(58) Field of Classification Search
  CPC ......... G06F 3/065; G06F 3/067; G06F 3/0619
  See application file for complete search history.

(56) References Cited

U.S. PATENT DOCUMENTS

| | | | | |
|---|---|---|---|---|
| 7,383,465 B1 * | 6/2008 | van Rietschote | ... | G06F 11/1471 714/13 |
| 7,809,691 B1 * | 10/2010 | Karmarkar | .......... | G06F 11/1469 707/674 |
| 9,665,306 B1 * | 5/2017 | Patwardhan | ............ | G06F 3/065 |
| 10,416,919 B1 * | 9/2019 | Cai | ....................... | G06F 3/0605 |
| 2007/0094467 A1 * | 4/2007 | Yamasaki | ........... | G06F 11/2082 711/162 |
| 2012/0284233 A1 * | 11/2012 | Otani | ..................... | G06F 16/128 707/649 |
| 2012/0290802 A1 * | 11/2012 | Wade | ..................... | G06F 16/128 711/162 |
| 2015/0066857 A1 * | 3/2015 | Dayal | ................... | G06F 16/128 707/639 |
| 2015/0186217 A1 * | 7/2015 | Eslami Sarab | ..... | G06F 11/1435 707/649 |
| 2015/0212893 A1 * | 7/2015 | Pawar | ................. | G06F 11/1448 707/649 |
| 2017/0206143 A1 * | 7/2017 | Ohmachi | ............ | G06F 11/1448 |
| 2018/0267713 A1 * | 9/2018 | Saito | ...................... | G06F 3/0631 |
| 2021/0096776 A1 * | 4/2021 | Kim | ........................ | G06F 3/067 |

* cited by examiner

*Primary Examiner* — Hiep T Nguyen
(74) *Attorney, Agent, or Firm* — Dergosits & Noah LLP; Todd A. Noah

(57) ABSTRACT

Described is a system for managing point-in-time backups (or "snapshots") of data that are stored as part of a primary storage. As part of a data protection service, a set of snapshots may be stored on the primary storage system for efficient and immediate recovery, and a set of corresponding recovery snapshots may be stored on a secondary storage system for recovery purposes. Accordingly, the system may provide the ability to leverage the efficient storage mechanisms of the primary storage, while still maintaining the data storage efficiency (e.g. costs) of the secondary storage. Moreover, the system may manage the snapshots stored on the primary and secondary storages independently. For example, the system may fully leverage the available capacity of storage pools within the primary storage by automatically purging certain snapshots from the primary storage while still maintaining the corresponding recovery snapshots on the secondary storage.

20 Claims, 4 Drawing Sheets

US 11,144,233 B1

EFFICIENTLY MANAGING POINT-IN-TIME COPIES OF DATA WITHIN A PRIMARY STORAGE SYSTEM

TECHNICAL FIELD

This disclosure relates to data storage systems, and more particularly, managing point-in-time backups of data within a primary storage system.

BACKGROUND

Data storage systems (or on-demand storage services) may provide various tools that are crucial for enterprise level network clients. For example, clients may rely on such systems to efficiently back up and recover data in the event of user error, data loss, system outages, hardware failure, or other catastrophic events to allow business applications to remain in service or quickly come back up to service. In addition, as part of a data storage service, providers may have products that allow clients to rollback their data back to a previous state by creating point-in-time backups (or "snapshots") of data. To provide such recovery functionality relatively quickly and without significant overhead, such products may be configured to store such point-in-time backups on high performance storage components. Moreover, to restrain the potential on-demand storage costs that may be incurred by using such high performance storage, storage policies may be designed to limit the amount of storage available for such point-in-time backups. However, such limits may restrict the recovery needs for certain clients, and in particular, clients with high recovery point objectives (RPOs), and recovery time objectives (RTOs). Accordingly, there is a continued need to provide efficient mechanisms for managing point-in-time backups of data as part of an overall data protection service provided by data storage systems.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
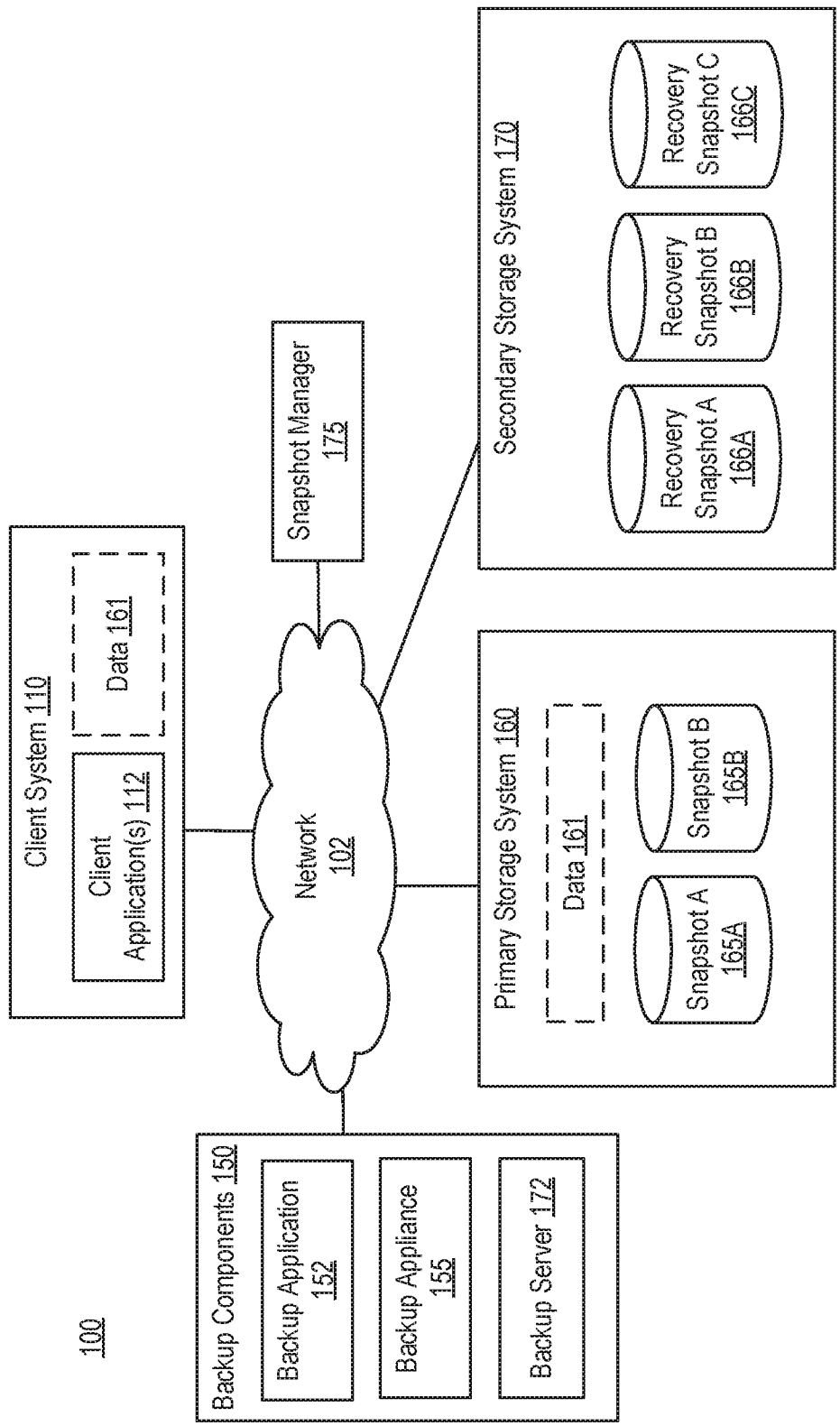
FIG. 1 is a block diagram illustrating an example operating environment for managing snapshots according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for managing point-in-time backups (or "snapshots") of data that are stored as part of a primary storage. For example, as part of a data protection service, a set of snapshots may be stored on a primary storage system (or primary storage resources) for efficient and immediate recovery, and a set of corresponding recovery snapshots may be stored on a secondary storage system for recovery purposes. Accordingly, the system may provide the ability to leverage the efficient storage mechanisms of the primary storage, while still maintaining the data storage efficiency (e.g. costs) of the secondary storage. Moreover, the system may manage the snapshots stored on the primary and secondary storages independently. For example, the system may fully leverage the available storage capacity of storage pools within the primary storage by automatically purging certain snapshots from the primary storage while still maintaining the corresponding recovery snapshots on the secondary storage. As a result, the system may automatically create and retain the most recent snapshots for immediate and direct recovery, while maintaining the ability to access a more comprehensive set of snapshots from the secondary storage if necessary.

To provide such functionality, the system may store a set of point-in-time snapshots of data on a primary storage system (e.g. production storage). The system may also store a corresponding recovery snapshot for each of the snapshots on a secondary remote storage system (e.g. recovery storage). The system may automatically manage snapshots by creating a most recent snapshot of the data, which is stored on the primary storage system, in response to identifying a storage event associated with the data. In addition, to efficiently manage a storage pool on the primary storage system, the system may automatically delete existing snapshots from the primary storage system. For example, the system may determine whether a limit for a total number of snapshots storable on the primary storage system has been reached, and if so, delete an existing snapshot from the set of snapshots stored on the primary storage system based on certain criteria. For example, the system may select particular snapshots for deletion based on determining whether certain snapshots have expired. As another example, the system may select the oldest set of snapshots for deletion.

Accordingly, the system may efficiently and automatically manage snapshots within a storage pool of a primary storage system. In addition, such snapshots may be managed independently from the corresponding recovery snapshots stored on a secondary storage system. For example, deleting the existing snapshot from the primary storage may include retaining the corresponding recovery snapshot on the secondary storage system.

The system may also initiate a recovery process as necessary. For example, the system may receive a request to recover the data to a particular point-in-time such as the point-in-time in which the most recent snapshot was taken. In response, the system may recover the data by restoring the most recent snapshot directly from the primary storage system. For example, recovering the data by restoring the most recent snapshot may include immediately recovering the snapshot data from the same storage pool as the original data. In addition, in some embodiments, the recovery may be performed independently of a backup application. For example, since the most recent snapshot may be stored on the block-based primary storage, the system may perform a recovery directly from a storage interface (e.g. primary storage system API) without invoking the backup application, which may be required for recovering data from an object-based secondary storage.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC™ Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components such as databases, storage servers, storage volumes, storage disks, backup servers, restore servers, backup clients, and restore clients, for example, can likewise take the form of software, physical machines or virtual machines (VM), though no particular component implementation is required for any embodiment.

Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include virtual storage systems provided by a cloud service provider.

More specifically, and with reference to FIG. 1, shown is a block diagram illustrating an example of an operating environment 100 for managing snapshots according to one or more embodiments of the disclosure.

In some embodiments, components of the operating environment 100 may provide data protection and recovery services to a client (or customer) associated with the client system 110. For example, these services may include a backup service that includes providing point-in-time backups of data referred to herein as snapshots. For example, a snapshot may be a point-in-time copy of data (e.g. an application 112) that a client wishes to protect as part of a backup service.

As shown, the environment 100 may include a client system 110, backup components 150, a primary storage system 160, a secondary storage system 170, and a snapshot manager 175. It should be noted that the components of operating environment 100 may interact via a network 102, which may be any type of wired or wireless network including a local area network (LAN), a wide area network (WAN), or a direct communication link, or other suitable connection.

The client system (or source system) 110 may act as a client from which data to be backed-up originates. The client system 110 may host (or include, store, etc.) one or more client applications 112, and store data 161 that may be protected as part of the data protection and recovery service. In some embodiments, the applications 121 may be considered part of the data 161 from which a snapshot is taken. As shown, in some embodiments, data 161 may also be stored within the primary storage system 160. Accordingly, snapshots of data 161 may be taken from data 161 stored on the client system 110 (e.g. a production application 112), and/or from the primary storage system 160. For example, production data (e.g. data 161) associated with a client may be stored within a data protection environment provided by the primary storage system 160. In some embodiments, the client system 110 may be considered a host device. In addition, in some embodiments, the client system 110 may be in the form of a VM.

The backup components 150 may include a backup application 152 that performs (or manages, coordinates, etc.) the creation and recovery (or restoration) of data 161 that may be backed-up. For example, data 161 to be backed-up from the client system 110 may be communicated from the client system 110 to the backup application 152 for initial processing, after which the processed data is uploaded from the backup application 152 for storage within the primary storage system 160. In some embodiments, the backup application 152 may cooperate with a backup client application of the client system 110 to back up client data to primary storage system 160. A backup application 152 may also cooperate with a backup client application to restore backup data from the storage systems 160/170 to the client system 110. In some embodiments, the backup application 152 may be a part of, or work in conjunction with, a backup appliance 155. For example, the backup (or storage) appliance 155 may include a Dell EMC CloudBoost appliance, although any suitable appliance is contemplated. In addition, the backup components 150 may include one or more of a backup server 172 that may be implemented in conjunction with a Data Domain deduplication storage server provided by Dell EMC for use with Data Domain™ Restorer (DDR) storage devices. In some embodiments, the backup server 172 may be a Dell EMC Avamar server or a Dell EMC Networker server, although no particular server is required, and other backup and storage system configuration are contemplated. It should be noted that the backup components 150 (e.g. backup application 152, backup appliance 155, or backup server 172) can be implemented in various forms, such as a virtual, physical, or native public cloud appliance to fit the requirements of a particular configuration, and the backup application 152 can be used with various types of data protection environments, including public and private object storage clouds.

As shown, the operating environment 100 may include a primary storage system 160, and a secondary storage system 170. For example, the primary storage system 160 may be part of a production environment (or production system), and the secondary storage system 170 may be part of a disaster recovery environment, both of which may provide data protection and recovery (or disaster recovery) services to a client (or customer). In some embodiments, the secondary storage system 170 may be a remote storage system (e.g. remote from the primary storage system 160). For example, the primary storage system 160 may be an on-premises system and the secondary storage system 170 may be part of a cloud-based system (or service). In some embodiments, the primary storage system 160 may also be provided as part of a cloud-based system (or service). However, in such scenarios, an entity (e.g. cloud service provider) providing the primary storage system 160 may be different than the entity (or entities) providing the secondary storage system 170. For example, the primary storage system 160 may use underlying storage hardware provided (or managed) by a data protection and backup service provider (e.g. Dell EMC), whereas the underlying storage hardware for the secondary storage system 170 may be provided by a different cloud-based provider for storage services (e.g. Amazon Web Services (AWS), or Microsoft Azure).

As shown, the primary storage system 160 may include a set of snapshots 165A-B that each correspond to a point-in-time backup (or copy) of data 161 (including an application 112). For example, it may be desirable to provide point-in-time backups of data to provide relatively fast recovery, and without significant overhead, by creating a data structure initially containing pointers that point to portions of data. For example, the primary storage system 160 may employ a redirect on write (ROW) technique. For instance, with redirect on write, new writes to snapped storage resources or their snapshots are redirected to a new location in the same storage pool, and pointers are updated to point to the new location. For example, as data is written to a storage resource (e.g. a logical volume), two different versions of data are maintained: a first version of the data represents the original data that existed when the snapshot was initiated, and a second version of the data represents the new data being written. For example, any subsequent writes to the same section overwrite the second version. In some embodiments, a snapshot 165 does not replicate a full copy of the original data 161. Rather, a snapshot 165 may only store differences between a current version of the data and the version of the data at the point in time when the snapshot 165 was taken. Moreover, since a snapshot 165 may be initiated by creating a table of pointers to actual data 161 within, for example, the same storage pool (or resource) of the primary storage system 160, there is a relatively low resource overhead and a time requirement for creating a snapshot 165. As a result, snapshots 165 are efficient for recovering from various types of errors. For example, if a database includes data for which a point-in-time copy is made at 10:00 a.m., and a user inadvertently erases important data at 11:00 a.m. (or a program error causes corruption of the data for the database), then it is possible to recover the 10:00 a.m. version of the data 161 using a snapshot 165.

It should be noted that there are many different specific mechanisms for providing snapshot copies, see, for example, U.S. Pat. No. 7,340,489 to Vishlitzky, et al., entitled "Virtual Storage Devices," and U.S. Pat. No. 6,792,518 to Armangau et al., entitled "Data Storage System Having Mata [Meta] Bit Maps for Indicating Whether Data Blocks are Invalid in Snapshot Copies," both of which are incorporated by reference herein in their entirety, and both of which are assigned to EMC IP Holding Company LLC.

The secondary storage system 170 may be configured to provide replication (or recovery, mirroring, etc.) capabilities for the primary storage system 160. As shown, the secondary storage system 170 may store a set of recovery snapshots 166A-C. In some embodiments, each snapshot 165 stored on the primary storage system 160 may be replicated to provide a corresponding recovery snapshot 166 that is stored on the secondary storage system 170. For instance, as shown in this example, snapshot A 165A and snapshot B 165B that are stored on the primary storage system 160, may each be replicated such that there are corresponding recovery snapshots A 166A and recovery snapshot B 166B, respectively, stored on the secondary storage system 170. In some embodiments, a storage policy (or storage service agreement, contract, etc.) associated with a client may limit the number of snapshots 165 that may be stored on the primary storage system 160. For instance, as shown in this example, a client may be limited to only storing two snapshots 165 on the primary storage system 160, and accordingly, a third snapshot (e.g. snapshot C) may only be retained as recovery snapshot C 166C that is stored on the secondary storage system 170.

It should be noted that the primary storage system 160 (and the secondary storage system 170) may be implemented using any suitable type of storage resources (or storage platform). In some embodiments, the primary storage system 160 may store the snapshots 165 as part of a block-based storage, and the secondary storage system 170 may store snapshots 166 as part of an object-based storage. In some embodiments, the primary storage system 160 may store data within a storage pool. For example, a storage pool may be a collection of physical storage components. In some embodiments, the primary storage system 160 may include logical unit numbers (LUNs), and consistency groups. In some embodiments, a LUN may be a logical unit of block storage that may be created as part of a storage pool. In some embodiments, the set of snapshots 165 (e.g. snapshots 165A-B) stored on the primary storage system 160 may also be stored within the same storage pool as the data 161. In some embodiments, a consistency group may include a collection of LUNs that are grouped together so that snapshot operations on a consistency group affect all the LUNs contained in the group. As a result, a consistency group provides recovery consistency if one or more LUNs are dependent upon each other.

As further described herein, a snapshot manager 175 may coordinate (or manage, orchestrate, execute, automate, etc.) various operations (or processes, methods, etc.) for managing snapshots 165/166. For example, the snapshot manager 175 may provide an interface that allows a user to perform various snapshot operations such as creating, deleting, replicating, recovering, etc. particular snapshots 165/166. In some embodiments, the snapshot manager 175 may be part of, or work in conjunction with, the backup components 150. In addition, in some embodiments, the snapshot manager 175 may be part of, or work in conjunction with, an operating system of a storage system. For example, the snapshot manager 175 may direct (or control, initiate, etc.) other components of the operating environment 100, such as the primary storage system 160, to perform various operations.

Figure 2:
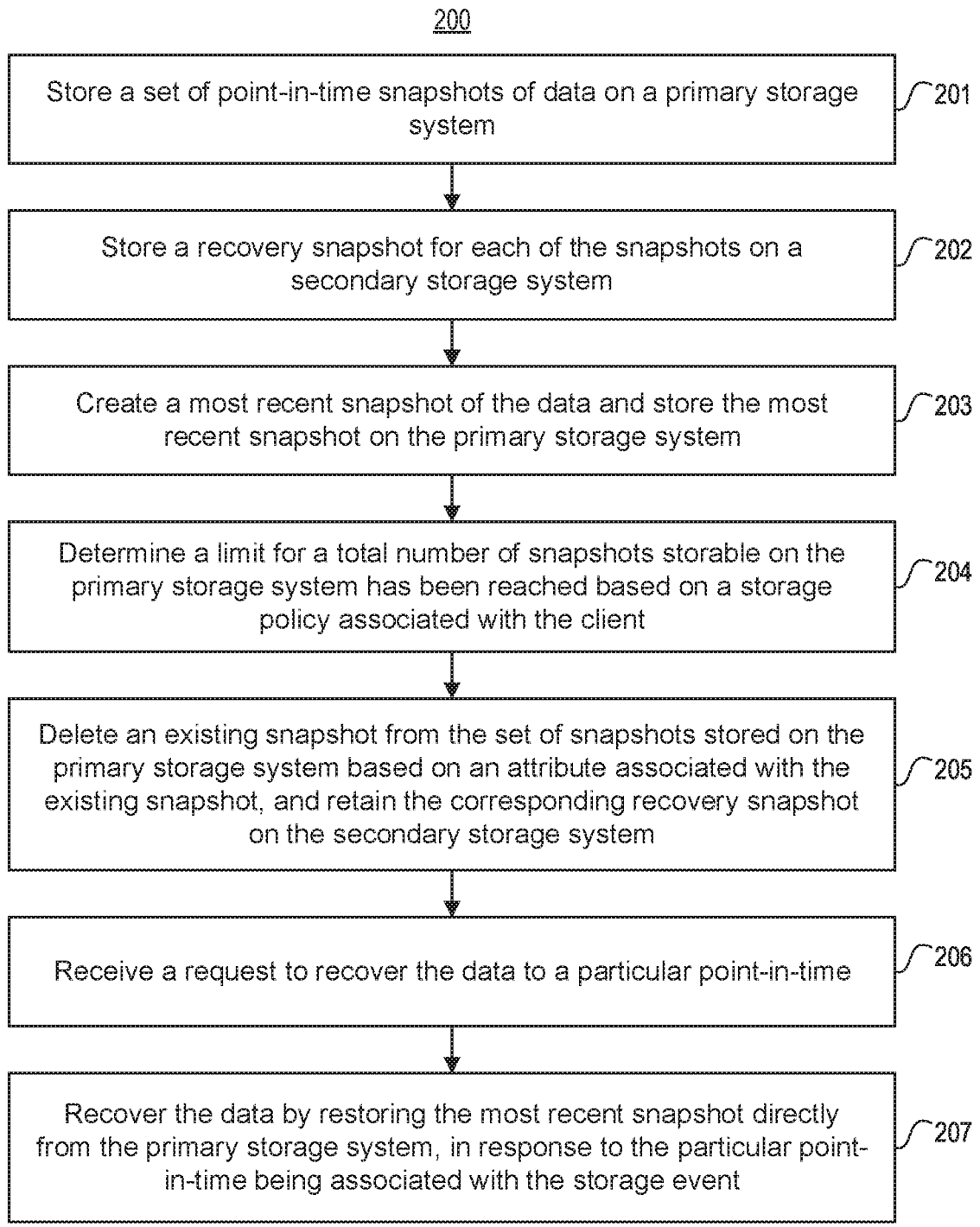
FIG. 2 is a flow diagram illustrating an example method of managing snapshots stored on a primary storage system according to one or more embodiments of the disclosure.

FIG. 2 is a flow diagram 200 illustrating an example method of managing snapshots stored on a primary storage system according to one or more embodiments of the disclosure. Process 200 may use processing logic, which may include software, hardware, or a combination thereof. For example, process 200 may be performed by a system including one or more components (e.g. snapshot manager 175) described in operating environment 100.

In 201, the system (e.g. snapshot manager 175) may store a set of point-in-time snapshots (e.g. snapshots 165) of data on a primary storage system (e.g. primary storage system 160). In some embodiments, the data (e.g. data 161) may be associated with a client of a data backup service. For example, the data backup service (e.g. as part of an overall data protection and backup service) may create, store, and manage snapshots of the data.

In some embodiments, the data associated with the client may be stored as part of a storage pool within the primary storage system. In addition, in some embodiments, the set of snapshots stored on the primary storage system may also be stored within the same storage pool as the data.

In 202, the system may store a recovery snapshot (e.g. snapshot 166) for each of the snapshots on a secondary storage system (e.g. secondary storage system 170). In some embodiments, the secondary storage system may be remote from the primary storage system. For example, to provide protection in the event the primary storage system fails, each snapshot stored on the primary storage system may be replicated and stored on the secondary storage system as a recovery snapshot.

In 203, the system may create a most recent snapshot of the data, and store the most recent snapshot on the primary storage system. In some embodiments, the system may create the most recent snapshot in response to identifying a storage event associated with the data. In some embodiments, a storage event may include any set of criteria or actions that may be identified by the system to initiate the creation of a snapshot. For example, the data may include an application from which a snapshot is taken, and the storage event may include an upgrade to the application. Accordingly, the system may take a snapshot of the application immediately prior to the upgrade to provide the ability to restore (or rollback) the application in the event there is an issue with the upgrade.

As described, the system may efficiently manage the storage capacity of the primary storage system by managing the snapshots stored on resources of the primary storage system.

In 204, the system may determine a limit for a total number of snapshots storable on the primary storage system has been reached based on a storage policy associated with the client. For example, a client may be associated with a storage policy that specifies the limit of the number of snapshots that may be created for a particular storage resource. For example, the limit may include a total number of snapshots stored on the primary storage system. As another example, the limit may include a number of snapshots stored within a particular storage pool. In some embodiments, the limit may be associated with a number of snapshots for one or more LUNs or consistency groups. For example, determining the limit for the total number of snapshots has been reached may include determining a limit for a number of snapshots associated with a particular LUN or consistency group has been reached.

In 205, the system may delete an existing snapshot from the set of snapshots stored on the primary storage system based on an attribute associated with the existing snapshot. Accordingly, the system may identify a particular existing snapshot to delete based on analyzing various attributes (or properties) that may be associated with a snapshot. For example, these properties may include a time (or the point-in-time) that the snapshot was created, an expiration, a state or current status (e.g. ready, initializing, offline, destroying, etc.), a source, whether the snapshot is replicated (e.g. synchronously or asynchronously), whether snapshot may be available for automatic deletion, or any other set of attributes.

In some embodiments, deleting the existing snapshot from the set of snapshots stored on the primary storage system may include retrieving an expiration date attribute for each of the snapshots from the set of snapshots stored on the primary storage. For example, the system may determine the existing snapshot has expired based on the expiration date attribute, and in response, delete the existing snapshot from the primary storage system.

In some embodiments, deleting the existing snapshot from the set of snapshots stored on the primary storage system may include retrieving a creation time attribute for each of the snapshots from the set of snapshots stored on the primary storage. For example, the system may determine the creation time attribute for the existing snapshot is the oldest creation time amongst the snapshots, and in response, delete the existing snapshot from the primary storage system.

As described, the system may manage snapshots stored on the resource and primary storage system independently of snapshots that are stored on the secondary storage resources. Accordingly, in some embodiments, deleting the existing snapshot from the set of snapshots may include retaining the recovery snapshot of the existing snapshot stored on the secondary storage system. For example, the recovery snapshots stored on the secondary storage resources may be managed (e.g. deleting) by providing independent instructions (or operations) specifically for the deletion of recovery snapshots. Accordingly, the recovery snapshot for the existing snapshot deleted from the primary storage system may be still be retained on the secondary storage system.

In 206, the system may receive a request to recover the data to a particular point-in-time. For example, the point-in-time may include a point-in-time of the most recently taken snapshot. In some embodiments, based on the particular point-in-time and/or the status of the primary storage array, the system may initiate recovery of the data by accessing resources on the primary storage system, or the secondary storage system.

In 207, the system may recover the data by restoring the most recent snapshot directly from the primary storage system. In some embodiments, the system may perform a recovery of the most recent snapshot in response to the particular point-in-time being associated with the storage event. For example, the system may identify an application upgrade as a storage event, and in response, may create a snapshot. Accordingly, in the event that the application upgrade requires a rollback, the system may receive a request to restore the snapshot to the point-in-time immediately prior to the application update.

In some embodiments, the data may be recovered directly from the primary storage system. For example, as described, the snapshot stored on the primary storage system may be part of a block-based storage, and accordingly, may be directly usable for recovering data. In addition, in some embodiments, recovering data from the primary storage system may include performing an immediate recovery. For example, recovering the data by restoring the most recent snapshot directly from the primary storage system may include immediately recovering the data by redirecting (or updating) a set of pointers for snapshot data associated with the most recent snapshot. In some embodiments, the snapshot data used for the recovery may be stored within the same storage pool as the original data.

As described, in some embodiments, direct and/or immediate recovery may include recovering data without requiring conversion of the snapshot data to a block-based (or file-based) format. For example, data stored on the secondary storage system may be stored as part of an object-based storage, and accordingly, may require conversion before recovering the original data. Accordingly, in some embodiments, the system may perform a recovery without invoking (or requiring, using, initiating, etc.) a backup application (e.g. backup application 152). For example, the system may perform a recovery directly from the primary storage system, and without the need for a backup application, by accessing an interface of the primary storage system (e.g. API) to obtain the necessary recovery data (e.g. snapshot). In addition, in some embodiments, the system may restore a snapshot of data to a useable state for testing (or recovery purposes). For example, the system may recover an application from a snapshot stored on the primary storage system for testing purposes. In the event the application fails, it may be recreated from the snapshot again (or as many times as necessary). For example, such an application may be created independently of a production application for testing purposes.

In some embodiments, the system may perform a recovery by restoring a recovery snapshot stored on the secondary storage system. For example, in response to the particular point-in-time of the recovery request being associated with the existing snapshot deleted from the primary storage system, the system may recover the data by restoring one of the recovery snapshots (e.g. the corresponding recovery snapshot for the deleted snapshot) stored on the secondary storage system.

As another example, in response to receiving the request to recover the data, the system may determine the primary storage system is unavailable. Accordingly, the system may recover the data by restoring one of the recovery snapshots stored on the secondary storage system, in response to the primary storage system being unavailable. For example, a primary storage resource may be unavailable if one or more resources are offline, associated with a hardware failure, exposed to a virus or malware, etc.

As yet another example, if the point-in-time of the recovery request is associated with an older snapshot, the system may retrieve such an older snapshot from the secondary storage. For example, the system may only store older snapshots on the secondary storage instead of the primary storage, which is reserved for more recent snapshots. Put another way, storage resources such as storage pools of the primary storage system may be reserved for certain types of snapshots.

In some embodiments, the recovery process may including transferring recovery data from the secondary storage system to the primary storage system. The retrieved recovery data may also be converted into data suitable for recovering the original data (e.g. application). For example, to create usable data, the recovery data may be converted from an object-based data structure to a block-based data structure.

In addition, in some embodiments, the system may restore a recovery snapshot of data to a useable state for testing (or recovery purposes). For example, the system may recover an application from a recovery snapshot directly within the secondary storage system for testing purposes. In some embodiments, such an application may be created independently of a production application that is stored (or executed from) the primary storage system.

Figure 3:
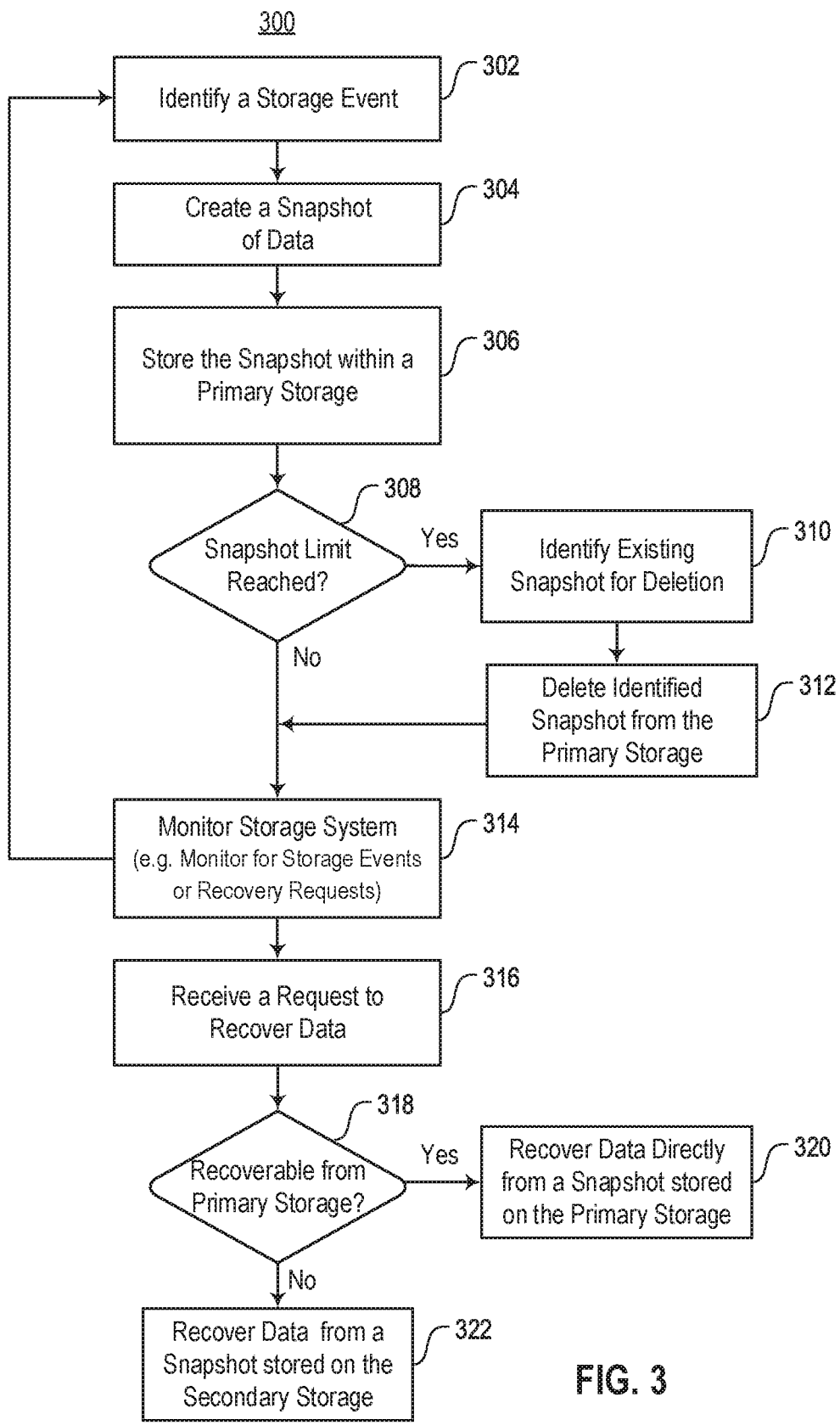
FIG. 3 is a process flow diagram illustrating an example process for managing snapshots distributed amongst a primary and secondary storage system according to one or more embodiments of the disclosure.

FIG. 3 is a process flow diagram 300 illustrating an example process flow for managing snapshots distributed amongst a primary and secondary storage system according to one or more embodiments of the disclosure. Process 300 may use processing logic, which may include software, hardware, or a combination thereof. For example, process 300 may be performed by a system including one or more components (e.g. snapshot manager 175) described in operating environment 100.

As shown, in 302, the system may identify a storage event associated with an application (e.g. data). In response to the storage event, in 304, the system may create a snapshot (e.g. most recent snapshot), and in 306, may store the snapshot within the primary storage system. For example, the system may add the created snapshot to a set of existing snapshots stored within the primary storage system. In addition, the system may store a corresponding recovery snapshot within the secondary storage system. In 308, the system may determine whether a limit for a number of snapshots stored within the primary storage system has been reached. If the limit has not been reached, the system may continue to monitoring the storage system in 314. However, if the limit for a number of snapshots has been reached, the system may proceed to 310, and identify an existing snapshot for deletion. As described, the system may identify (or select, determine, etc.) a particular existing snapshot for deletion based on various attributes such as an expiration date, creation date, or other type of attribute. Once an existing snapshot stored on the primary storage system has been identified for deletion, the system may proceed to delete the existing snapshot in 312. It should be noted that when the system requires deletion of an existing snapshot, the created snapshot (e.g. created in 304) may be added to the set of existing snapshots in 306, before or after, actually deleting an existing snapshot from the primary storage in 312.

After performing snapshot management, the system may continue to monitor the storage system in 314. For example, as part of the monitoring, the system may repeat the process starting at operation 302, in response to identifying the next storage event. In addition, the system may wait until a recovery process is required. For example, in 316, the system may receive a request to recover data (e.g. initiate a recovery process). In response, in 318, the system may process the request to determine whether the data may be recovered from the primary storage system. For example, the system may determine which snapshot to restore as part of the recovery process. If the processing determines a snapshot stored on the primary storage system is required, in 320, the system may directly restore a snapshot stored on the primary storage system. For example, the system may restore the snapshot immediately from the primary storage system without performing data conversion, and/or without requiring a backup application. If the processing determines a recovery snapshot stored on the secondary storage system is required, in 322, the system may restore a recovery snapshot stored on the secondary storage system. For example, the system may initiate a data conversion process for the recovery snapshot depending on the storage architecture of the secondary storage system. Accordingly, the system may perform efficient management and restoration of snapshots distributed amongst a primary and secondary storage system.

Figure 4:
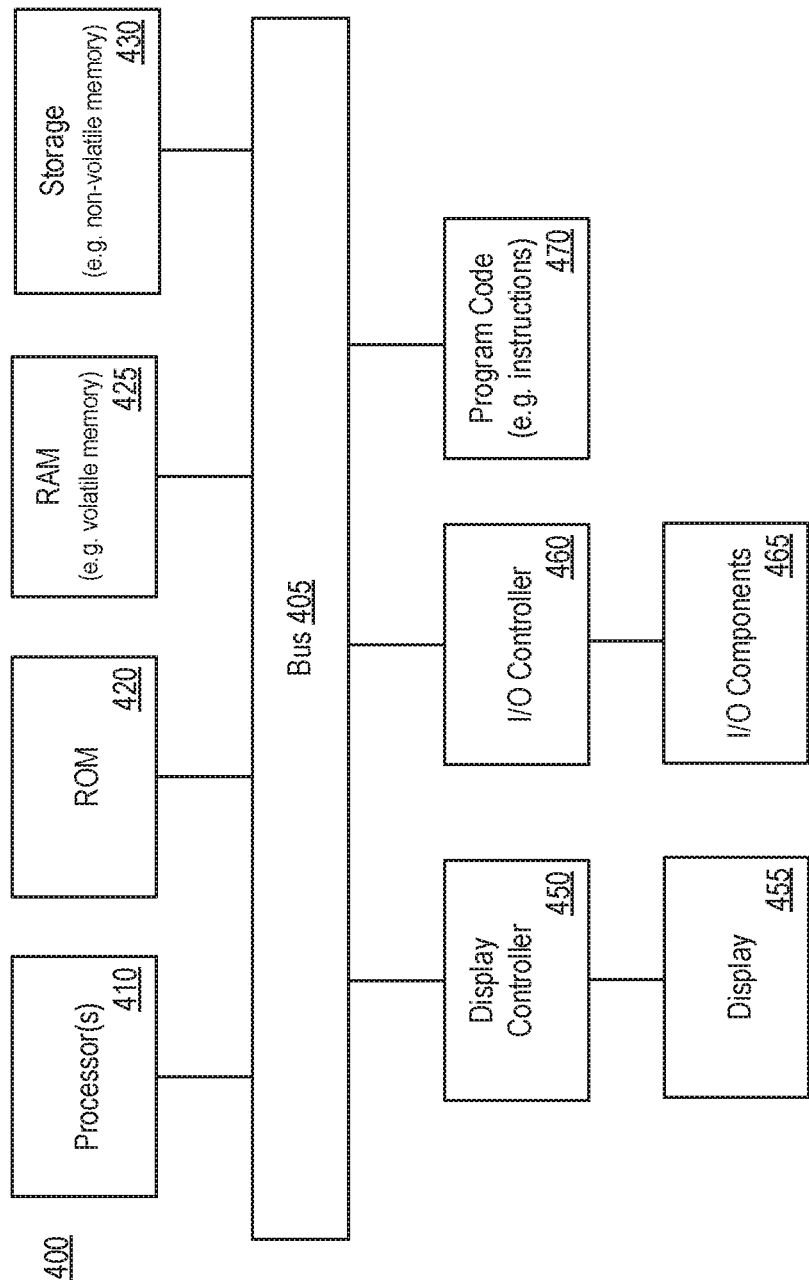
FIG. 4 is a block diagram illustrating an example computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g. snapshot manager 175, primary storage system 160, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g. snapshot manager 175). Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions, which when executed, cause the one or more processors to:
store a set of point-in-time snapshots of data on a primary storage system, the data associated with a client of a data backup service;
store a recovery snapshot for each of the snapshots on a secondary storage system, the secondary storage system remote from the primary storage system;
create a most recent snapshot of the data and store the most recent snapshot on the primary storage system, in response to identifying a storage event associated with the data;
determine a limit for a total number of snapshots storable on the primary storage system has been reached based on a storage policy associated with the client;
delete an existing snapshot from the set of snapshots stored on the primary storage system based on an attribute associated with the existing snapshot, the deleting the existing snapshot from the set of snapshots includes retaining the recovery snapshot of the existing snapshot stored on the secondary storage system;
receive a request to recover the data to a particular point-in-time; and
recover the data by restoring the most recent snapshot directly from the primary storage system, in response to the particular point-in-time being associated with the storage event.

2. The system of claim 1, wherein the deleting the existing snapshot from the set of snapshots stored on the primary storage system includes:
retrieving an expiration date attribute for each of the snapshots from the set of snapshots stored on the primary storage;
determining the existing snapshot has expired based on the expiration date attribute; and
deleting the existing snapshot from the primary storage system, in response to determining the existing snapshot has expired.

3. The system of claim 1, wherein the deleting the existing snapshot from the set of snapshots stored on the primary storage system includes:
retrieving a creation time attribute for each of the snapshots from the set of snapshots stored on the primary storage;
determining the creation time attribute for the existing snapshot is the oldest creation time amongst the snapshots; and
deleting the existing snapshot from the primary storage system, in response to determining the creation time attribute for the existing snapshot is the oldest creation time amongst the snapshots.

4. The system of claim 1, wherein determining the limit for the total number of snapshots storable on the primary storage system has been reached includes determining a limit for a number of snapshots associated with a particular LUN or consistency group has been reached.

5. The system of claim 1, wherein the plurality of instructions, when executed, further cause the one or more processors to:
recover the data by restoring one of the recovery snapshots stored on the secondary storage system, in response to the particular point-in-time being associated with the existing snapshot deleted from the primary storage system.

6. The system of claim 1, wherein the data and the set of snapshots are stored as part of the same storage pool within the primary storage system.

7. The system of claim 1, wherein recovering the data by restoring the most recent snapshot directly from the primary storage system includes immediately recovering the data by redirecting a set of pointers for snapshot data associated with the most recent snapshot.

8. A method comprising:
storing a set of point-in-time snapshots of data on a primary storage system, the data associated with a client of a data backup service;
storing a recovery snapshot for each of the snapshots on a secondary storage system, the secondary storage system remote from the primary storage system;
creating a most recent snapshot of the data and store the most recent snapshot on the primary storage system, in response to identifying a storage event associated with the data;
determining a limit for a total number of snapshots storable on the primary storage system has been reached based on a storage policy associated with the client;
deleting an existing snapshot from the set of snapshots stored on the primary storage system based on an attribute associated with the existing snapshot, the deleting the existing snapshot from the set of snapshots includes retaining the recovery snapshot of the existing snapshot stored on the secondary storage system;
receiving a request to recover the data to a particular point-in-time; and
recovering the data by restoring the most recent snapshot directly from the primary storage system, in response to the particular point-in-time being associated with the storage event.

9. The method of claim 8, wherein the deleting the existing snapshot from the set of snapshots stored on the primary storage system includes:
retrieving an expiration date attribute for each of the snapshots from the set of snapshots stored on the primary storage;
determining the existing snapshot has expired based on the expiration date attribute; and
deleting the existing snapshot from the primary storage system, in response to determining the existing snapshot has expired.

10. The method of claim 8, wherein the deleting the existing snapshot from the set of snapshots stored on the primary storage system includes:
retrieving a creation time attribute for each of the snapshots from the set of snapshots stored on the primary storage;
determining the creation time attribute for the existing snapshot is the oldest creation time amongst the snapshots; and
deleting the existing snapshot from the primary storage system, in response to determining the creation time attribute for the existing snapshot is the oldest creation time amongst the snapshots.

11. The method of claim 8, wherein determining the limit for the total number of snapshots storable on the primary storage system has been reached includes determining a limit for a number of snapshots associated with a particular LUN or consistency group has been reached.

12. The method of claim 8, further comprising:
recovering the data by restoring one of the recovery snapshots stored on the secondary storage system, in response to the particular point-in-time being associated with the existing snapshot deleted from the primary storage system.

13. The method of claim 8, wherein the data and the set of snapshots are stored as part of the same storage pool within the primary storage system.

14. The method of claim 8, wherein recovering the data by restoring the most recent snapshot directly from the primary storage system includes immediately recovering the data by redirecting a set of pointers for snapshot data associated with the most recent snapshot.

15. A computer program product comprising a non-transitory computer-readable medium having a computer-readable program code embodied therein to be executed by one or more processors, the program code including instructions to:
store a set of point-in-time snapshots of data on a primary storage system, the data associated with a client of a data backup service;
store a recovery snapshot for each of the snapshots on a secondary storage system, the secondary storage system remote from the primary storage system;
create a most recent snapshot of the data and store the most recent snapshot on the primary storage system, in response to identifying a storage event associated with the data;
determine a limit for a total number of snapshots storable on the primary storage system has been reached based on a storage policy associated with the client;
delete an existing snapshot from the set of snapshots stored on the primary storage system based on an attribute associated with the existing snapshot, the deleting the existing snapshot from the set of snapshots includes retaining the recovery snapshot of the existing snapshot stored on the secondary storage system;
receive a request to recover the data to a particular point-in-time; and
recover the data by restoring the most recent snapshot directly from the primary storage system, in response to the particular point-in-time being associated with the storage event.

16. The computer program product of claim 15, wherein the deleting the existing snapshot from the set of snapshots stored on the primary storage system includes:
retrieving an expiration date attribute for each of the snapshots from the set of snapshots stored on the primary storage;
determining the existing snapshot has expired based on the expiration date attribute; and
deleting the existing snapshot from the primary storage system, in response to determining the existing snapshot has expired.

17. The computer program product of claim 15, wherein the deleting the existing snapshot from the set of snapshots stored on the primary storage system includes:
retrieving a creation time attribute for each of the snapshots from the set of snapshots stored on the primary storage;
determining the creation time attribute for the existing snapshot is the oldest creation time amongst the snapshots; and
deleting the existing snapshot from the primary storage system, in response to determining the creation time attribute for the existing snapshot is the oldest creation time amongst the snapshots.

18. The computer program product of claim 15, wherein determining the limit for the total number of snapshots storable on the primary storage system has been reached includes determining a limit for a number of snapshots associated with a particular LUN or consistency group has been reached.

19. The computer program product of claim 15, wherein the program code includes further instructions to:
recover the data by restoring one of the recovery snapshots stored on the secondary storage system, in response to the particular point-in-time being associated with the existing snapshot deleted from the primary storage system.

20. The computer program product of claim 15, wherein the data and the set of snapshots are stored as part of the same storage pool within the primary storage system, and wherein recovering the data by restoring the most recent snapshot directly from the primary storage system includes immediately recovering the data by redirecting a set of pointers for snapshot data associated with the most recent snapshot.

* * * * *